(12) United States Patent
Schnipke et al.

(10) Patent No.: US 7,690,835 B2
(45) Date of Patent: Apr. 6, 2010

(54) MIXER WITH PIVOTABLE BOWL

(75) Inventors: Janice J. Schnipke, Springfield, OH (US); Joseph C. Huang, Dayton, OH (US); Neal H. Blackburn, Springfield, OH (US); Brian E. Bader, Springfield, OH (US)

(73) Assignee: Premark FEG L.L.C., Wilmington, DE (US)

( * ) Notice: Subject to any disclaimer, the term of this patent is extended or adjusted under 35 U.S.C. 154(b) by 9 days.

(21) Appl. No.: 12/174,036

(22) Filed: Jul. 16, 2008

(65) Prior Publication Data
US 2008/0291777 A1    Nov. 27, 2008

Related U.S. Application Data

(62) Division of application No. 11/578,320, filed as application No. PCT/US2005/011584 on Apr. 5, 2005, now Pat. No. 7,438,463.

(60) Provisional application No. 60/568,908, filed on May 7, 2004.

(51) Int. Cl.
  *A21C 1/14* (2006.01)
(52) U.S. Cl. ........................ 366/207; 220/660
(58) Field of Classification Search ............. 366/96–98, 366/197–199, 203, 206–207, 288; 99/348; 220/735–736, 660; 215/379, 386
See application file for complete search history.

(56) References Cited

U.S. PATENT DOCUMENTS

| 32,482 A | 6/1861 | Lane |
|---|---|---|
| 140,527 A | 7/1873 | Munson, Jr. |
| 227,239 A | 5/1880 | Frentress |
| 320,255 A | 6/1885 | Jackson |
| 613,888 A | 11/1898 | Schmuck |
| 735,353 A | 8/1903 | Eifert |
| 760,693 A | 5/1904 | Lancaster et al. |
| 826,223 A | 7/1906 | Broadwell |
| 879,590 A | 2/1908 | Roth |
| 910,648 A | 1/1909 | Davison |
| 1,143,484 A | 6/1915 | Beach |
| 1,264,128 A | 4/1918 | Rataiczak |
| 1,366,114 A | 1/1921 | Boggs |

(Continued)

FOREIGN PATENT DOCUMENTS

DE        1070563        12/1959

(Continued)

OTHER PUBLICATIONS

"Varimixer Food Mixer Model W60", A welbilt Company (2 pgs) (Sep. 1966).

(Continued)

*Primary Examiner*—Charles E Cooley
(74) *Attorney, Agent, or Firm*—Thompson Hine LLP

(57) ABSTRACT

A mixer system including a bowl for receiving a material to be mixed, a mixer body having a rotatable output component, and a hinge. The bowl is pivotable about the hinge relative to the mixer body such that the bowl can be pivoted between a loading/unloading position and a closed position relative the mixer body. The mixer may include a magnetic bowl detector and the bowl may include a magnet thereon.

20 Claims, 8 Drawing Sheets

U.S. PATENT DOCUMENTS

| | | | |
|---|---|---|---|
| 1,415,735 A | 5/1922 | Trust et al. |
| 1,428,704 A | 9/1922 | Petri |
| 1,468,615 A | 9/1923 | Gettenstein et al. |
| 1,548,041 A | 8/1925 | Johnston et al. |
| 1,548,919 A | 8/1925 | Ward |
| 1,562,704 A | 11/1925 | Kevan |
| 1,634,777 A | 7/1927 | Girdler |
| 1,695,345 A | 12/1928 | Read |
| 1,733,945 A | 10/1929 | Dehuff |
| 1,743,271 A | 1/1930 | Gould |
| 1,761,237 A | 6/1930 | Schiff |
| 1,767,002 A | 6/1930 | Johnston et al. |
| 1,774,509 A | 9/1930 | Gould |
| 1,781,321 A | 11/1930 | Dehuff |
| 1,807,589 A | 6/1931 | Edmunds |
| 2,024,282 A | 12/1935 | Geiger |
| 2,122,628 A | 7/1938 | Tracy |
| 2,181,079 A | 11/1939 | Dehuff |
| 2,251,903 A | 8/1941 | Anstice et al. |
| 2,613,847 A | 10/1952 | Lacher |
| 3,073,493 A | 1/1963 | Pfaffenberger |
| 3,075,746 A | 1/1963 | Yablonski et al. |
| 3,255,913 A | 6/1966 | Helm |
| 3,533,603 A | 10/1970 | Kovacs |
| 3,556,341 A * | 1/1971 | Rains .................... 220/483 |
| 3,633,719 A | 1/1972 | Lynch |
| 3,758,183 A | 9/1973 | Steinkamp et al. |
| 4,042,221 A | 8/1977 | Myers et al. |
| 4,135,828 A | 1/1979 | Cabak |
| 4,173,925 A | 11/1979 | Leon |
| 4,283,148 A | 8/1981 | Peterson |
| 4,402,466 A | 9/1983 | Schmidt |
| 4,528,718 A | 7/1985 | Brockhaus et al. |
| 4,765,746 A | 8/1988 | Suay Puig |
| 4,823,633 A | 4/1989 | Pike |
| 4,854,711 A | 8/1989 | Hagan |
| 4,937,916 A | 7/1990 | Redman |
| 4,946,285 A | 8/1990 | Vennemeyer |
| 5,048,709 A | 9/1991 | Alverson |
| 5,123,747 A | 6/1992 | Derksen |
| 5,157,983 A | 10/1992 | Sankovic |
| 5,306,083 A | 4/1994 | Caldwell et al. |
| 5,325,980 A | 7/1994 | Grimm et al. |
| 5,325,982 A | 7/1994 | Cobb, Jr. |
| 5,348,393 A | 9/1994 | Pappas, Jr. |
| 5,385,422 A | 1/1995 | Kruger et al. |
| 5,409,149 A | 4/1995 | Hough |
| 5,472,276 A | 12/1995 | Ratermann et al. |
| 5,494,350 A | 2/1996 | Childress |
| 5,653,535 A | 8/1997 | Xie et al. |
| 5,690,427 A | 11/1997 | Jennings |
| 5,806,704 A | 9/1998 | Jamison |
| 5,860,738 A | 1/1999 | Brinkman |
| 5,934,802 A | 8/1999 | Xie |
| 6,092,647 A | 7/2000 | Yeh et al. |
| 6,494,610 B1 | 12/2002 | Brunswick |
| 6,595,680 B2 | 7/2003 | Sanpei et al. |
| 6,883,959 B2 | 4/2005 | Donthnier et al. |
| 6,966,691 B2 | 11/2005 | Brunswick et al. |
| 6,991,363 B2 | 1/2006 | Brunswick et al. |
| 7,384,187 B2 | 6/2008 | Blackburn et al. |
| 7,387,430 B2 | 6/2008 | Short et al. |
| 7,438,463 B2 * | 10/2008 | Schnipke et al. ............ 366/203 |
| 2002/0093877 A1 | 7/2002 | Brunswick et al. |
| 2002/0181322 A1 | 12/2002 | Brunswick et al. |
| 2004/0120213 A1 | 6/2004 | Short et al. |
| 2004/0120215 A1 | 6/2004 | Huang et al. |
| 2004/0120216 A1 | 6/2004 | Donthnier et al. |
| 2004/0208082 A1 | 10/2004 | Huang et al. |
| 2005/0002272 A1 | 1/2005 | Brunswick et al. |
| 2005/0141340 A1 | 6/2005 | Donthnier et al. |

FOREIGN PATENT DOCUMENTS

| | | |
|---|---|---|
| DE | 1298510 | 7/1969 |
| EP | 0637462 | 2/1995 |
| EP | 1027920 | 8/2000 |
| EP | 1114671 A1 | 7/2001 |
| EP | 1151669 | 7/2001 |
| FR | 1079799 | 5/1954 |
| FR | 2728485 | 6/1996 |
| FR | 2740064 | 4/1997 |
| FR | 2805177 | 8/2004 |
| GB | 120393 | 3/1919 |
| GB | 672619 | 5/1952 |
| JP | 11-347390 | 12/1999 |
| TW | 477242 | 2/2002 |
| TW | 430691 | 5/2003 |
| WO | WO 96-30114 | 10/1996 |
| WO | WO 03-037494 | 5/2003 |
| WO | WO 2005-112722 | 12/2005 |

OTHER PUBLICATIONS

"100% Gear Transmission Mixer," Univex (3 pgs) (Date Unknown).
"The Best Values Just Got Better", Spar Mixer (2 pgs) (Date Unknown).
"Heavy Duty Dough Mixers," Spar Mixer (2 pgs) (Date Unknown).
"EM20 Heavy Duty Professional 20 Quart Mixer," Didto Dean Food Prep (2 pgs) (date Unknown).
Service Manual "Models H-600 and H-600T and L-800 Mixers," Hobart Corporation (Sep. 1977).
Instructions Manual "H600 & L800 Mixers", Hobart Corporation (Dec. 1999).
Instructions Manual . . . with Catalog of Replacement Parts—Hobart Models A-200 and A-@00T Mixers, The Hobart Manufacturing Company (15 pgs) (Feb. 1996).

* cited by examiner

MIXER WITH PIVOTABLE BOWL

CROSS-REFERENCE TO RELATED APPLICATIONS

This application is a divisional of U.S. Patent Application Ser. No. 11/578,320, filed Oct. 12, 2006, now U.S. Pat. No. 7,438,463 B2, which is a national phase filing of PCT/US05/011584, filed Apr. 5, 2005, which claims priority to U.S. Provisional Application No. 60/568,908, filed May 7, 2004, the details of both of which are hereby incorporated by reference as if fully set forth herein.

TECHNICAL FIELD

The present application is directed to a bowl that can be pivotally coupled to a mixer, and to a mixer system having a pivotal bowl.

BACKGROUND

Mixers are used to mix and blend a wide variety of materials. The mixers typically include a mixer body having a motor that drives a generally vertically-extending mixing element, and a bowl that is located below the mixing element. The bowl receives the materials to be mixed and the lower end of the rotatable mixing element therein. The bowl is typically detachable from the mixer body to aid in loading and unloading the materials into the bowl, and to enable cleaning, repair or replacement of the bowl.

In some mixers, the mixer bowl is vertically movable relative to the body such that the bowl can be lowered away from the mixing element. The materials to be mixed can then be added to or removed from the bowl while the bowl is in its lowered position. However, even after the bowl is lowered, the location and orientation of the overhanging head portion of the mixer body relative to the bowl may limit access to the bowl to add or remove materials from the bowl.

SUMMARY

A mixer has a bowl that is pivotally coupled to the mixer body, enabling the bowl to pivot away from the mixer body, which can provide increased access to the bowl. The bowl may include a magnetic sensor actuator thereon for triggering a magnetic sensor on the mixer body when the bowl is in a certain position, such as a closed position. The magnetic sensor, or some other type of sensor, may act as a single sensor that determines when the bowl is both in a bowl closed and bowl up position. The mixer body may also include a bowl retainer or holder that includes a curved surface that interacts with a curved surface on a bowl protrusion or stabilization member, facilitating slight tilting of the bowl when moved into or out of its closed position relative to the mixer body.

DETAILED DESCRIPTION

Figure 1:
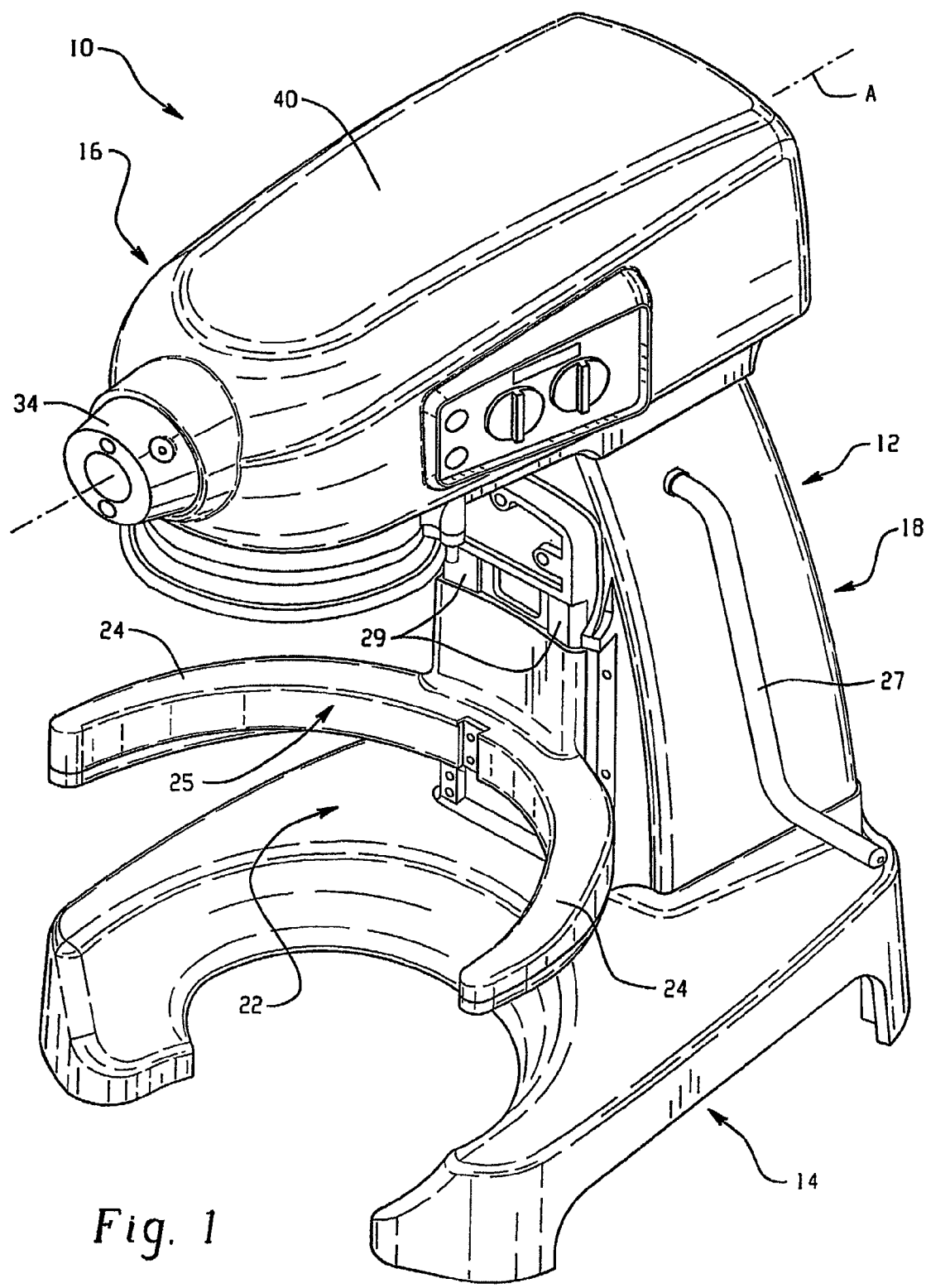
FIG. 1 is a perspective view of one embodiment of a mixer.
Figure 2:
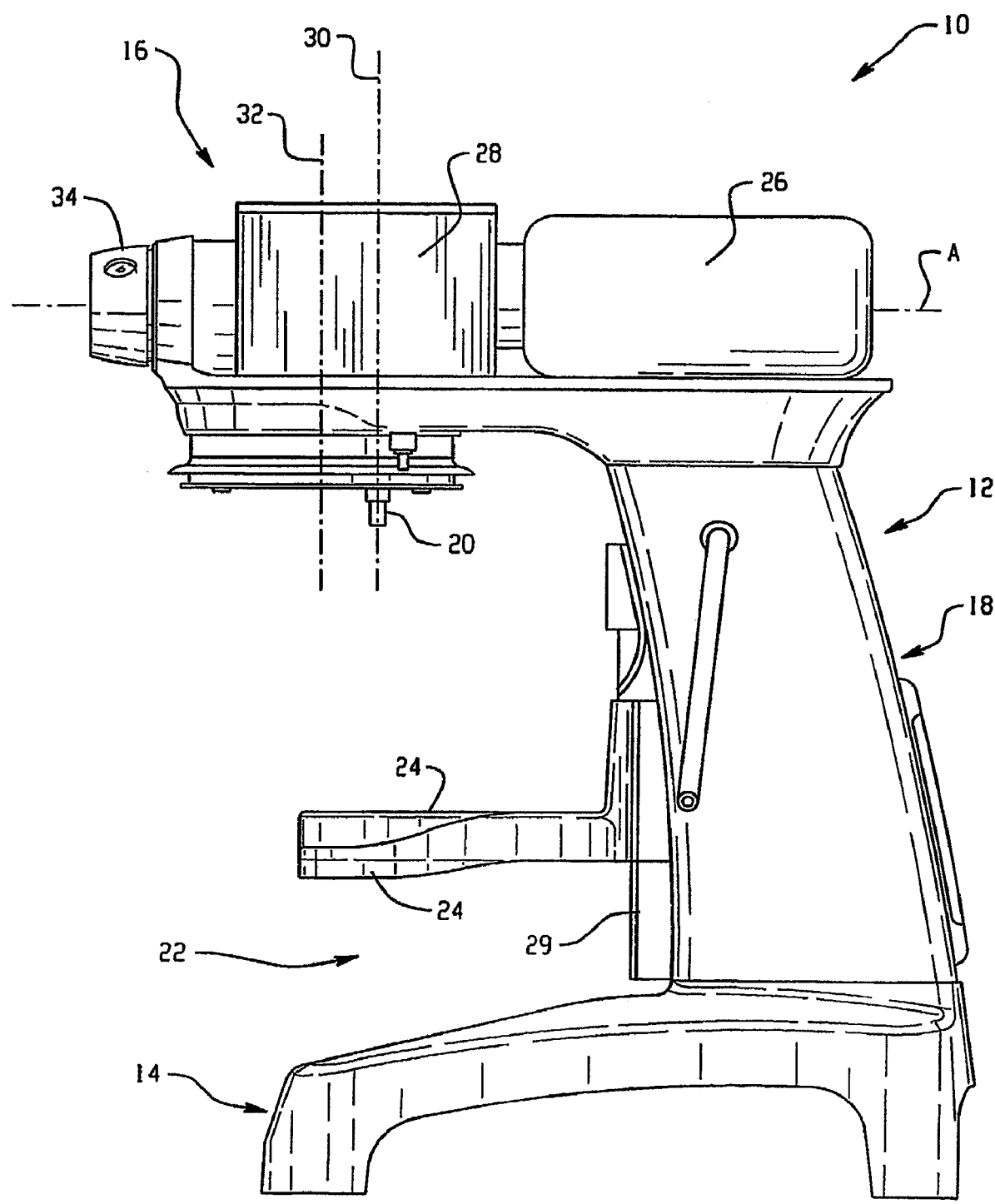
FIG. 2 is a side elevation of the mixer of FIG. 1 with head cover removed.

Referring to FIGS. 1 and 2, a mixing machine 10 includes a mixer body 12 having a base portion 14, a head portion or overhang portion 16 and a support portion 18 (e.g., in the form of a column or pedestal) connecting the head portion and the base portion in a vertically spaced apart relationship. A front to back head portion axis A is shown. An output member 20 (e.g., a shaft for receiving a mixer tool such as a beater or whip) extends downwardly from the head portion 16 in a direction toward a bowl receiving location 22 formed between the arms 24 of a bowl receiving yoke 25 that can be moved upward and downward relative to the head portion 16 by rotation of the illustrated handle 27. In one example, the handle 27 operates a gear system within the column that is linked to the yoke 25 and the yoke 25 is mounted for sliding movement along spaced apart tracks 29 at the front side of column 18 when the handle 27 is rotated. A motor 26 may be mechanically linked to the output member 20, as by a gear system 28, for effecting rotation of the output member about a first axis 30 and orbiting movement of the output member 20 and first axis 30 about a second axis 32 (e.g., a planetary movement or planetary rotation). A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28. Head cover 40 is shown installed in FIG. 1, but is removed in FIG. 2.

Figure 3:
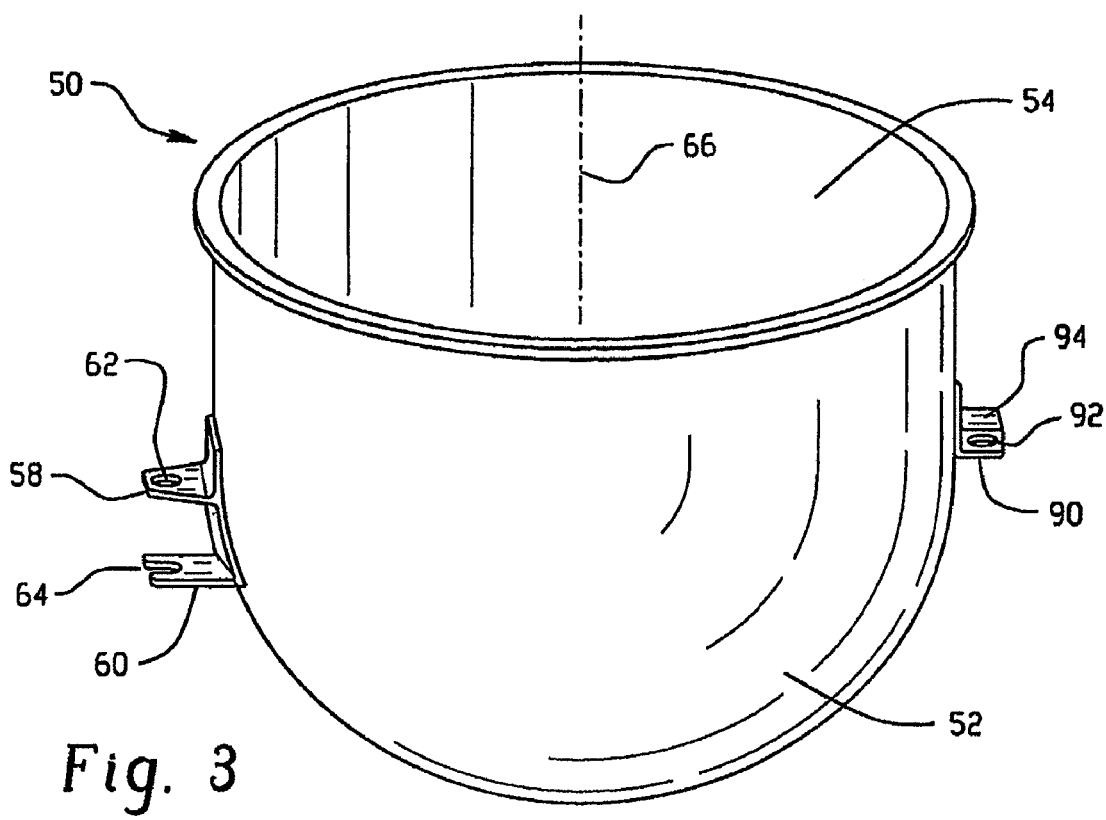
FIG. 3 is a perspective view of one side of a mixer bowl.
Figure 4:
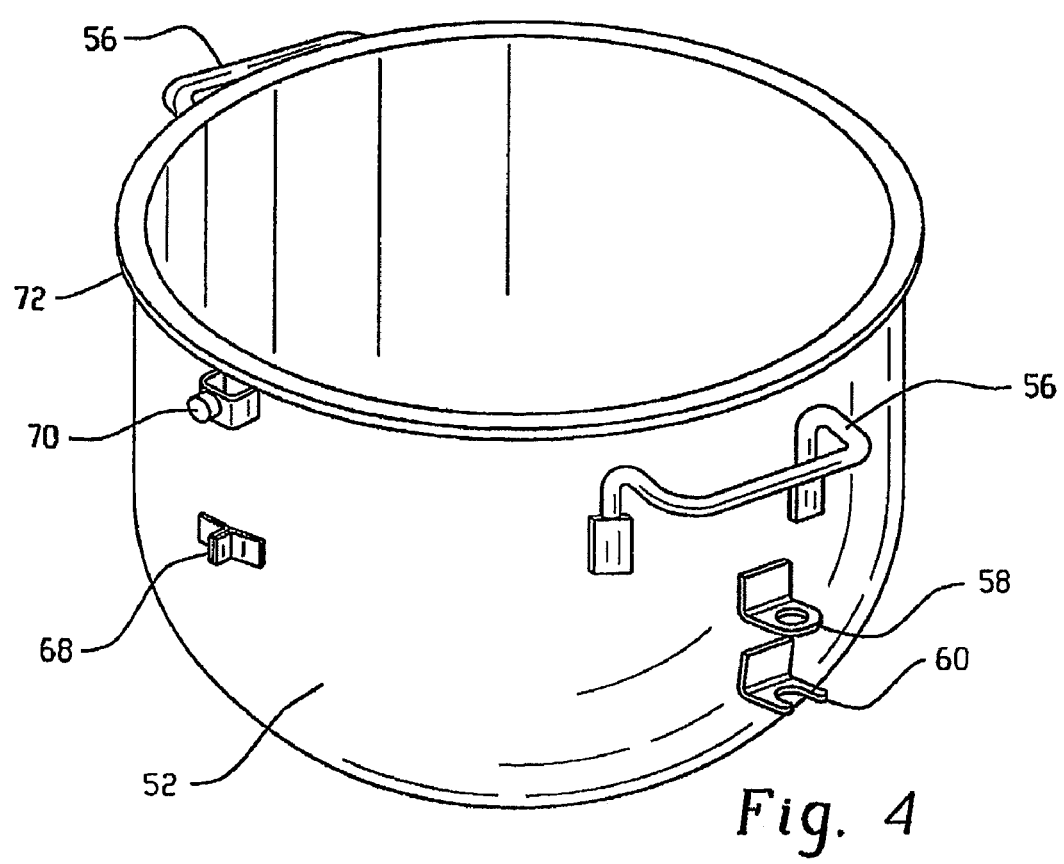
FIG. 4 is a perspective view of another side of the mixer bowl of FIG. 3.
Figure 6:
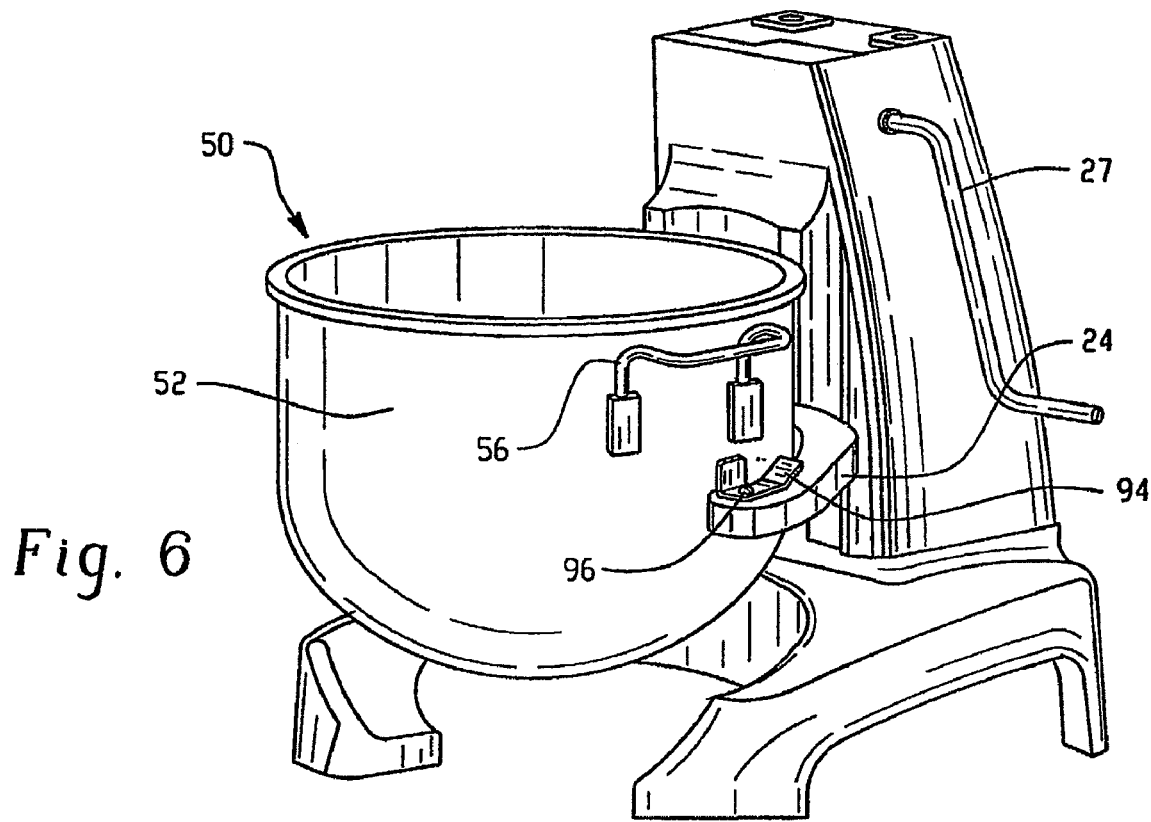
FIG. 6 is a perspective view of the arrangement of FIG. 5 with the bowl moved to a closed position.

Referring now to FIGS. 3-4, a bowl 50 includes bowl body 52 with upper opening 54 for receiving material to be mixed, and substantially diametrically opposed handles 56 (not shown in FIG. 3) extending from the bowl body for carrying the bowl 50. Pivot hinge components are also provided. Notably, vertically spaced apart brackets 58 and 60 each include a respective opening 62 and 64, with openings 62 and 64 aligned circumferentially and arranged vertically one above the other. A single bracket with two outwardly projecting parts could also be used to provide the openings. In the illustrated embodiment, the body of bracket 58 completely surrounds opening 62. Opening 64 is only partially surrounded by the body of bracket 60, such that opening 64 is open at an edge facing radially outward from a center axis 66 of the bowl. However, variations are possible. The rear part of the bowl includes a stabilization bracket 68 extending therefrom at a position about midway down the depth or height of the bowl body 52. Located above and substantially in circumferential alignment with the stabilization bracket 68, a sensor actuator 70 is positioned near the upper rim 72 of the bowl. For the purpose of this application, the rear of the bowl is defined as the part of the bowl that is positioned adjacent the mixer body when the bowl is mounted in a closed position on the mixer body as shown in FIG. 6. Sensor actuator 70 and stabilization bracket 68 are circumferentially spaced from both the brackets 58 and 60, and the locking bracket 90 (described below) by about 90 degrees.

When the bowl 50 is mounted for pivot on the mixer body (FIGS. 5 and 6), the bracket openings 62 and 64 engage with a pin 74 located toward the end of one arm 24 of bowl yoke 25, the bowl yoke mounted for upward and downward movement along a mixer body column or pedestal 18. In the illustrated embodiment, the pin 74 is located on the right arm of the mixer bowl yoke (relative to a rear to forward direction of the mixer head). The mixer head is not shown in FIGS. 5-6. The illustrated pin 74 is fixed to and extends entirely through the right arm 24 of yoke 25 to provide both a vertically upward extending portion that engages with the opening 62 of upper bracket 58 and a vertically downward extending portion that engages with the opening 64 of lower bracket 60. Alternatively two separate pins, one connected into the top of the arm 24 and one connected into the bottom of the arm 24, could be used. To place the bowl 50 on the mixer body, the bowl is positioned to place the upper opening 62 over the top of the upwardly projecting part of the pin 74 and the slotted, lower opening 64 is aligned with the downwardly projecting part of the pin. When the bowl is released, the combined interaction between upper opening 62 and upper part of pin 74 and lower opening 64 and lower part of pin 74 provides a stable pivot hinge for the bowl that supports the bowl throughout its range of pivoting movement.

Figure 5:
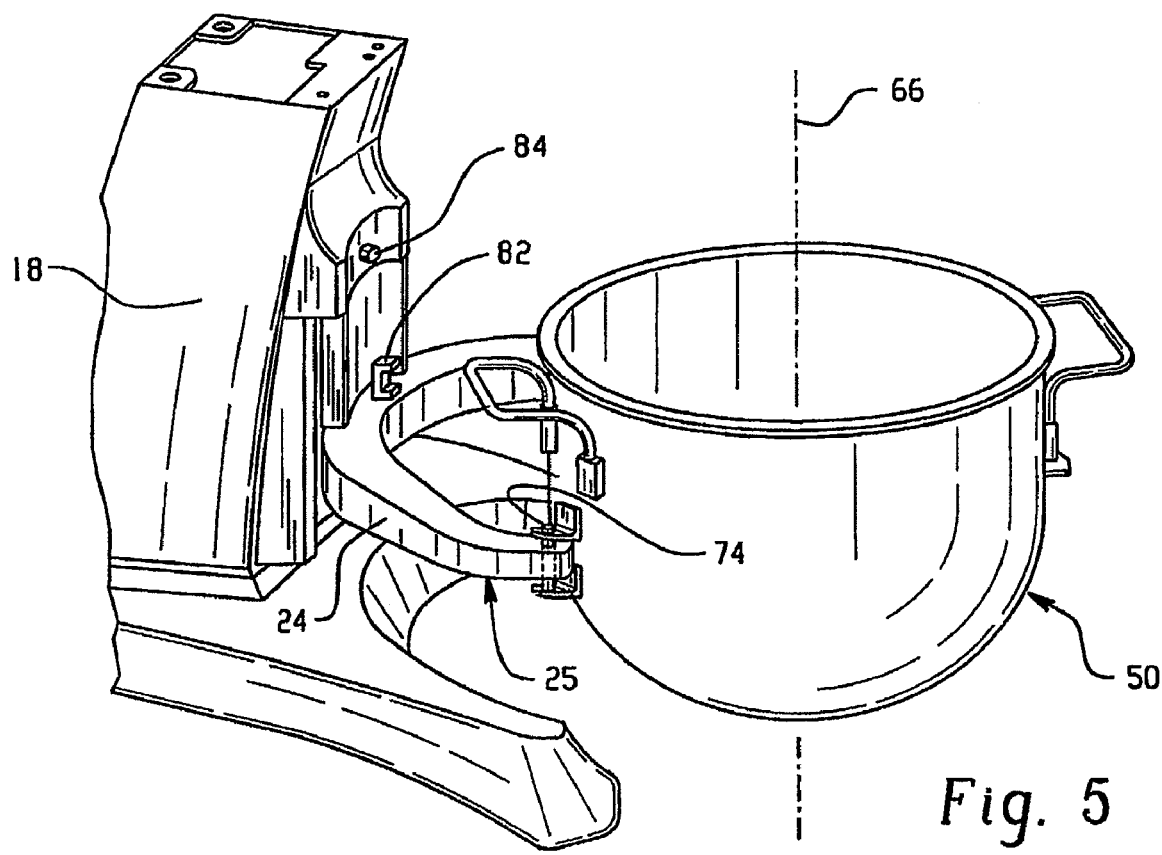
FIG. 5 is a perspective view of a mixer bowl pivotably mounted to a mixer and in a bowl open position.

FIG. 5 shows the bowl 50 in an open position, away from the mixer body, and FIG. 6 shows the bowl in the closed position, adjacent the mixer body. When the bowl 50 is moved into the closed position, stabilization bracket 68 moves into a support channel or slot 82 provided on the yoke 25 of the mixer body. Sensor actuator 70 also moves into position to actuate or trigger a bowl sensor 84 located on the column 18 of the mixer body. In one embodiment, the sensor actuator 70 is a magnetic member (outputting a magnetic field) and the bowl sensor 84 is a magnetic detector, such a reed switch. However, embodiments having a non-magnetic actuator that makes contact with a bowl sensor could also be used. In the illustrated embodiment, the sensor 84 is located on the mixer body such that the sensor actuator 70 only aligns with the sensor 84 when the bowl 50 is in the closed position and the bowl yoke 25 has been moved upward into a mixing position. The output of bowl sensor 84 is provided to the control system of the mixer and the control system prevents the drive motor from operating, thereby inhibiting automated movement of the rotatable and orbital output shaft (not shown) unless the bowl 50 is detected as being in the closed and up position. Other mixer operations could be inhibited, restricted or enabled based upon the output of the bowl sensor 84.

Figure 14:
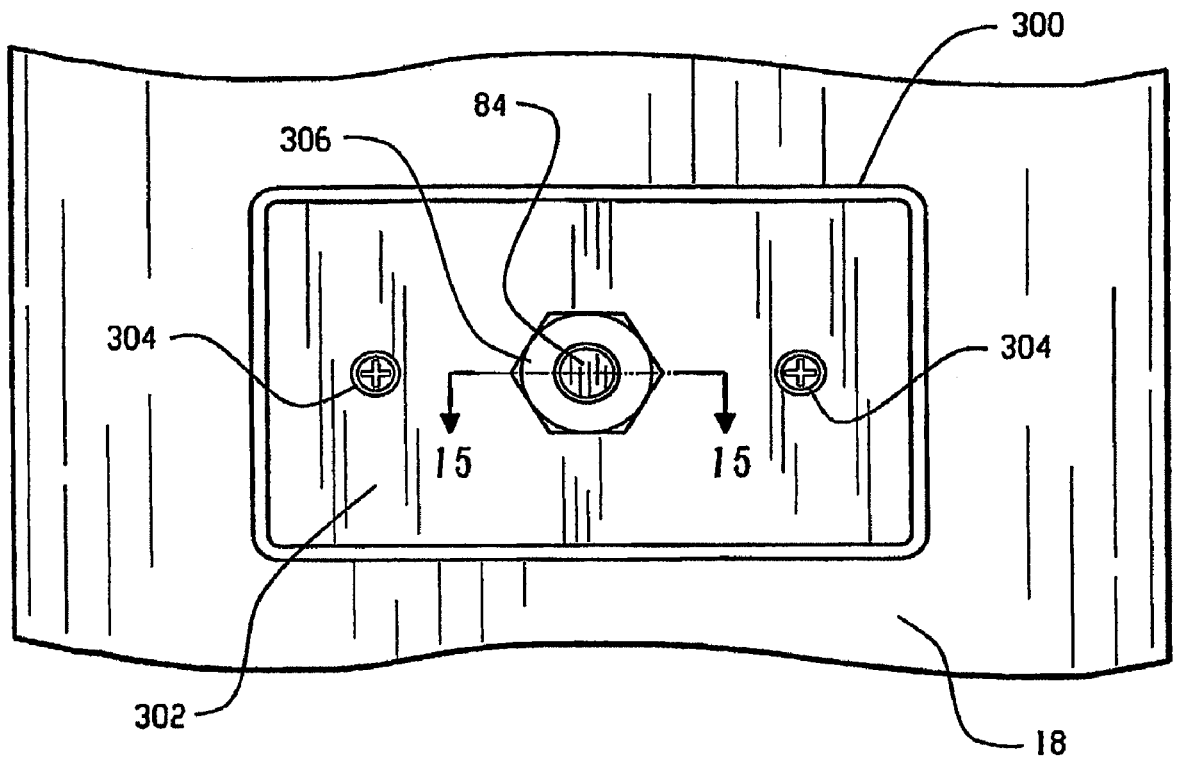
FIGS. 14 and 15 show an exemplary mixer bowl sensor assembly on a mixer.
Figure 15:
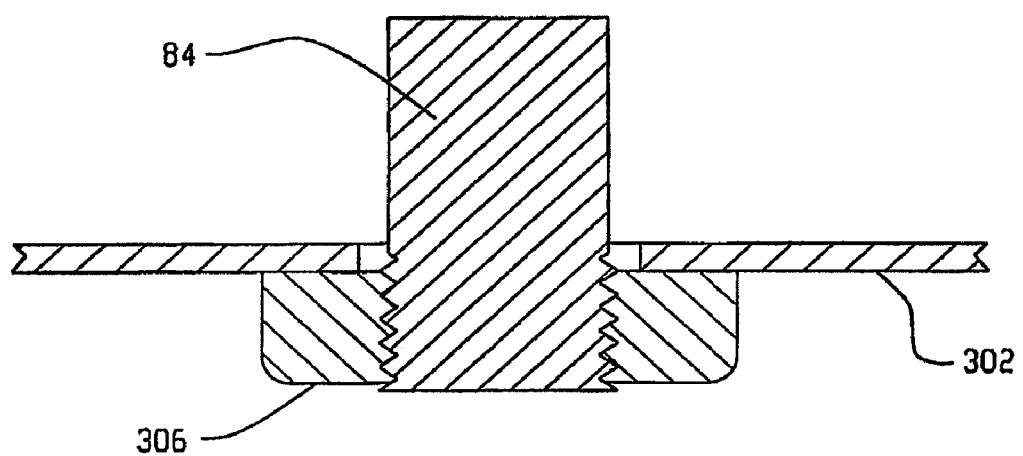

Referring to FIGS. 14 and 15, an exemplary bowl sensor configuration is provided. Specifically, the bowl sensor 84 is located at the front of column 18, which may be a casting having a rectangular opening 300 therein. A metal plate 302 is secured over the opening as by fasteners 304. The sensor 84, which may be of externally threaded cylindrical construction with, for example, a reed switch embedded therein, protrudes through the plate 302. A nut 306 is threaded onto the protruding part of the sensor 84 to hold in place and/or to protect the sensor 84.

Locking bracket 90 (FIGS. 3 and 6), which may be provided substantially diametrically opposite to brackets 58 and 60, includes an opening 92 therein and an upwardly bent ramp part 94 extending toward the rear of the mixer bowl. As the bowl 50 is moved to the closed position, a lower surface of ramp part 94 moves over the top of a locking pin 96 located toward, and extending upward from the end of left arm 24 of yoke 25, causing the bowl 50 to tilt slightly and moving the opening 92 over the top of pin 96, at which time the bowl tilts back downward to move the opening 92 into engagement with the pin 96 as shown in FIG. 6, thereby hold the bowl 50 in the closed position. The lower surface of ramp part 94, while facing downward, extends generally upward and away from a generally horizontal part of the bracket 90. To move the bowl 50 out of the closed position, handle 56 is used to lift the locking bracket side of the bowl 50 slightly so that the opening 92 disengages from the pin 96.

Figure 7:
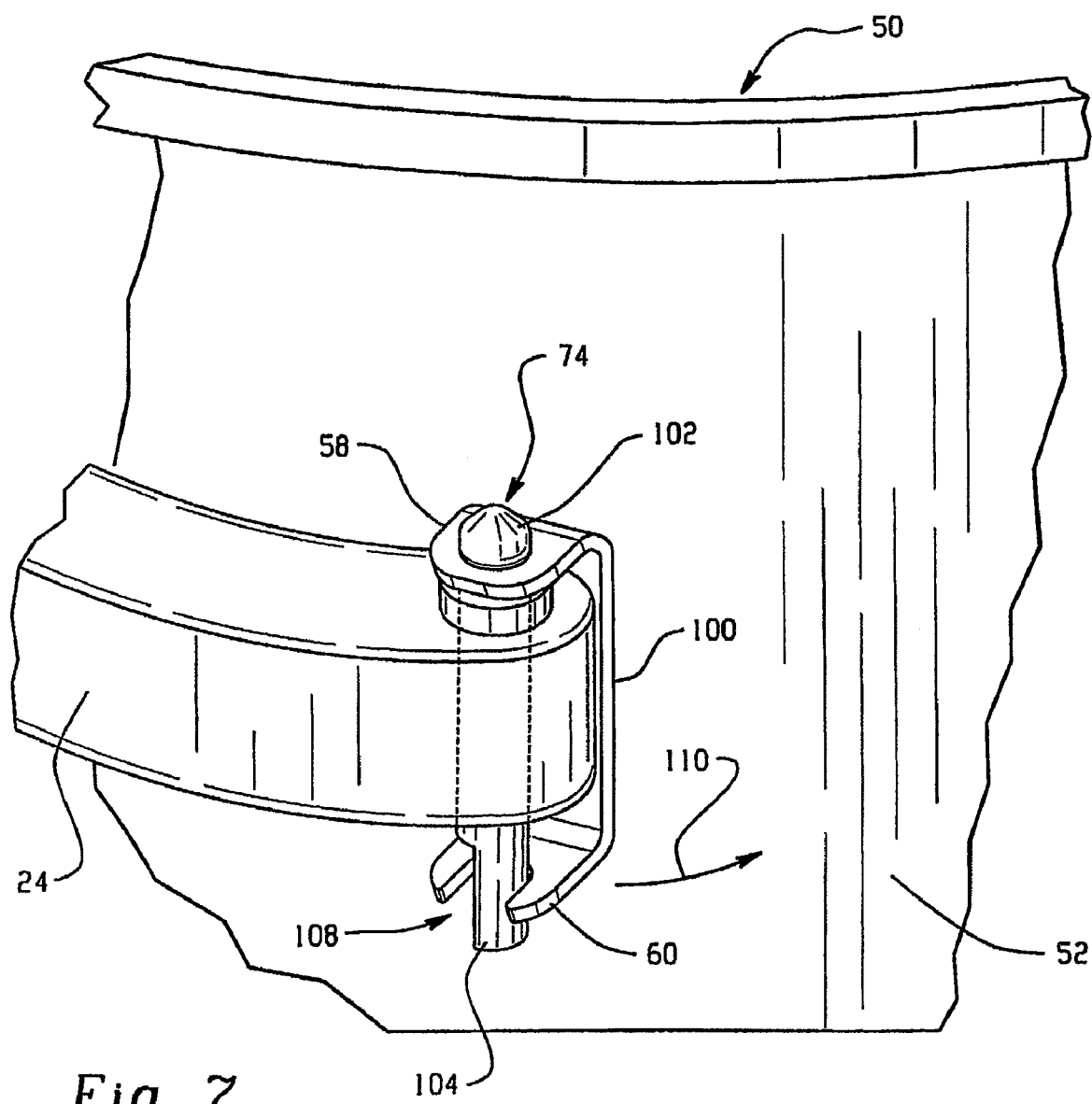
FIG. 7 a partial perspective view of a pivot connection between a bowl and a mixer.
Figure 8:
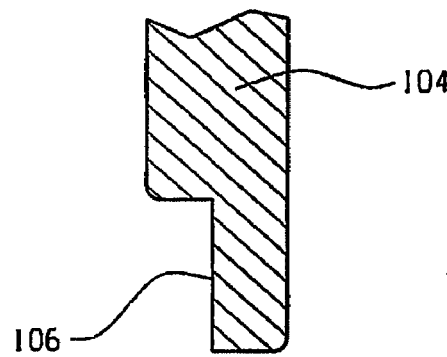
FIG. 8 is a partial cross section of the pivot pin of FIG. 7.

Referring now to FIG. 7, an enlarged partial view of one embodiment of the pin 74 in cooperation with the brackets 58 and 60 of bowl 50 is shown. In this embodiment brackets 58 and 60 extend from a common bracket link 100. Upper part 102 of pin is tapered or rounded for ease of receiving the opening of bracket 58. Lower part 104 of pin 74 includes a cutout or cutaway 106 (best seen in the partial cross-section of FIG. 8) at its rearward facing side to provide a slight rearwardly located spacing 108 (FIG. 7) between the opening of bracket 60 and the pin part 104. This spacing 108 facilitates slight tilting of the bowl in the direction of arrow 110 when the bowl is moved to or from its closed position as described above. In one embodiment the bracket 60 may actually be in a non-contacting position relative to lower pin part 104 when the bowl is in the closed position, with bracket 60 only contacting lower pin part 104 when the bowl is pivoted out of the closed position.

Figure 9:
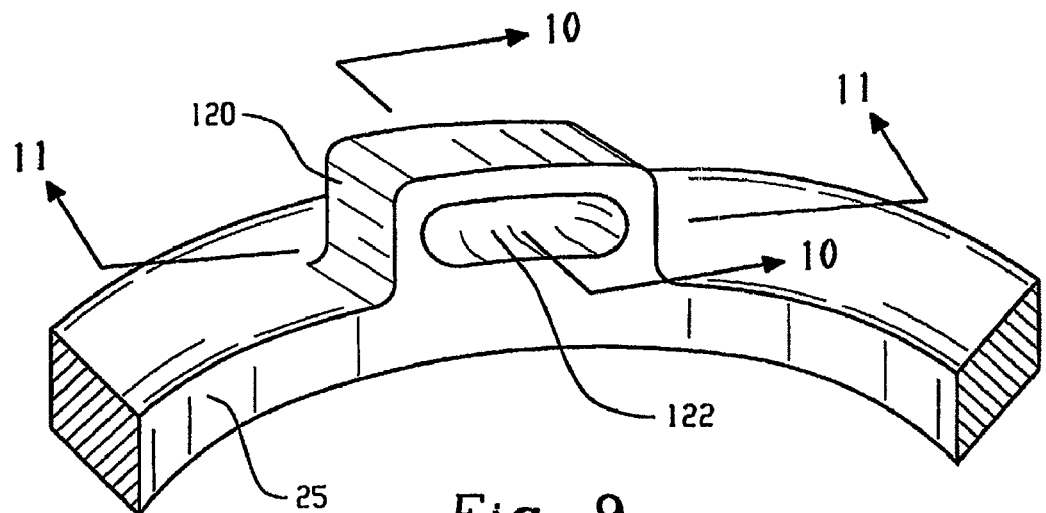
FIG. 9 is a partial perspective of a rear portion of a bowl yoke with a bowl holder.
Figure 10:
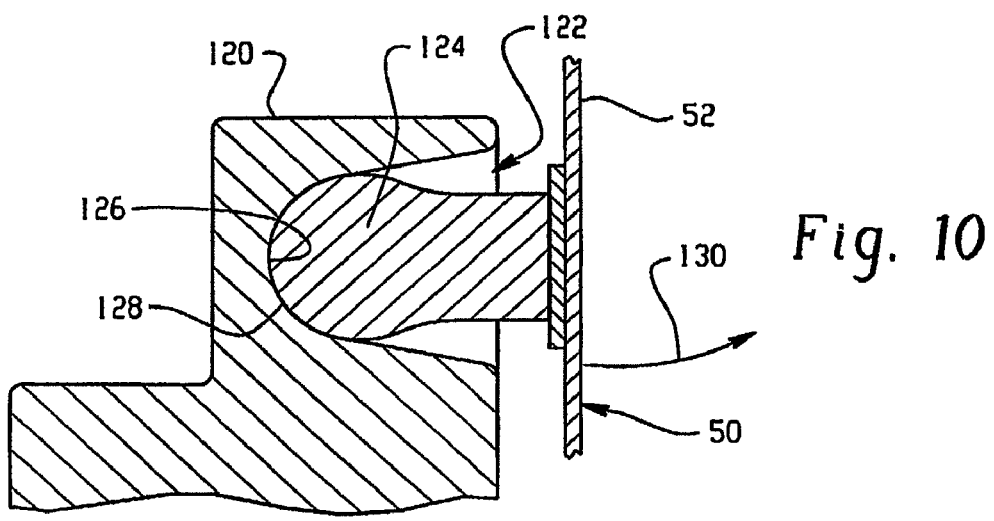
FIG. 10 is a cross-section taken along line 10-10 of FIG. 9.
Figure 11:
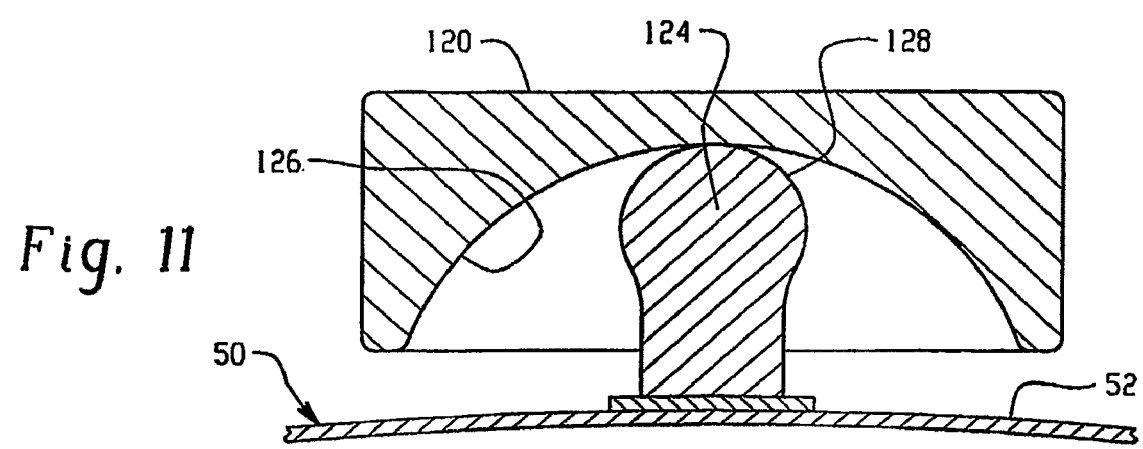
FIG. 11 is a cross-section taken along line 11-11 of FIG. 9.

Referring now to FIG. 9, an enlarged partial view of a rear portion of a bowl yoke 25 is shown. Whereas FIG. 5 provides a support channel 82 in the form of a generally C-shaped member with a rectangular channel therein, the embodiment of FIG. 9 provides a bowl retainer or holder 120 with an opening 122 that provides one or more curved surfaces therein. In particular, referring to FIG. 10, a cross section of the holder taken along line 10-10 of FIG. 9 is shown, where a stabilization member 124 that protrudes from a bowl body 52 is also shown. Notably, stabilization member 124 has a configuration different than the stabilization bracket 68 of FIG. 4. Inner surface 126 of opening 122 is generally curved from top to bottom, and the outer surface 128 of stabilization member 124 is also curved. The curvature of the two surfaces may be substantially the same. When the bowl 50 is in the closed position with member 124 in opening 122 as shown, the surface 128 of member 124 contacts the surface 126 of the opening 122 to provide some restriction against bowl movement. However, the curved surfaces permit the bowl to be readily tipped in the manner shown by arrow 130 when the bowl is moved to or from its closed position as described above. Moreover, rattling noise during mixing operations is effectively reduced, as compared to the C-shaped channel 82 and stabilization bracket 68, because any up and down movement of member 124 within opening 122 tends to result in sliding contact between the surfaces 126 and 128. As shown in FIG. 11, which shows a cross-section of the holder taken along line 11-11 of FIG. 9, the surface 126 of opening 122 may also be curved from side-to-side. Such curvature facilitates readily cleaning the surface 126. The side-to-side curvature, which may bar arcuate, may generally be slightly larger than that defined by the movement path of the member 124 during pivot of the bowl 50, thereby allowing member 124 to readily move into and out of the opening 122.

Figure 12:
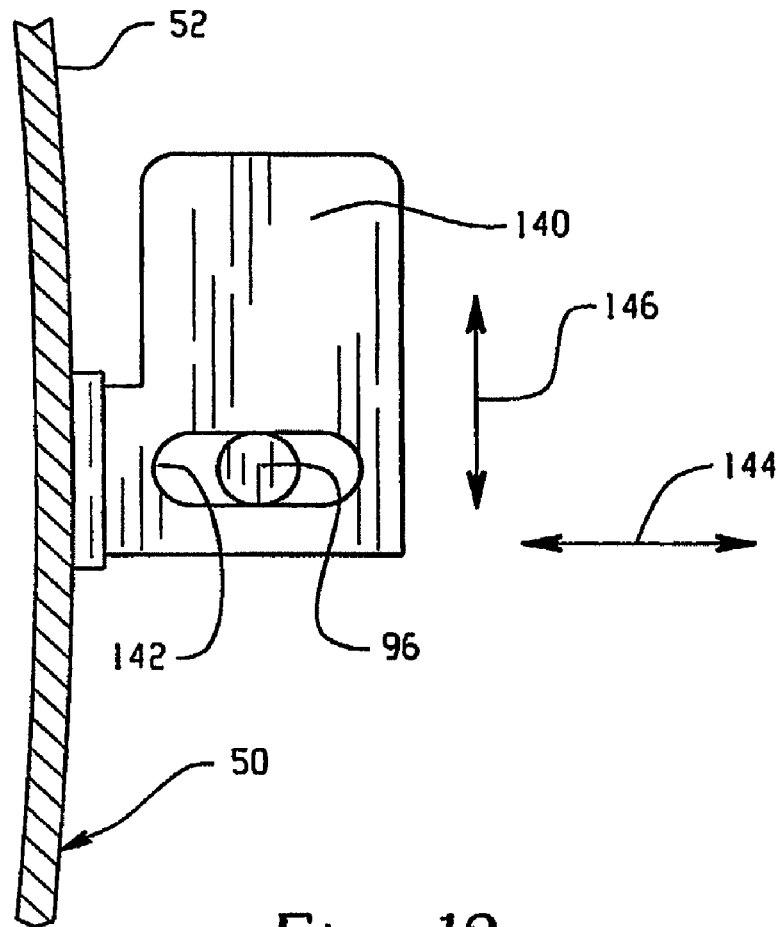
FIG. 12 is a partial top view of a bowl locking bracket engaged with a mixer yoke locking pin.

Referring now to FIG. 12, a top view of another embodiment of a bowl locking bracket 140 is shown. As compared to locking bracket 90 of FIG. 3, locking bracket 140 includes opening 142 that is oval, or otherwise elongated, instead of circular. Opening 142 is shown engaged with the locking pin 96 as would be the case when the bowl 50 is in its closed position. Notably, the oval nature of the opening 142 is in the side-to-side direction reflected by arrow 144 (also generally a radially outward direction relative to an upright axis of the bowl) to allow play in that direction, but the opening 142 is sized in front-to-rear direction 146 (also generally a direction tangential to an outer surface of the bowl body and/or perpendicular to radial direction 144) to cooperate closely with the pin 96 and restrict any significant movement in such direction 146. By forming opening 142 as an elongated slot, manufacturing tolerances for the bowl with locking bracket can be more forgiving.

Figure 13:
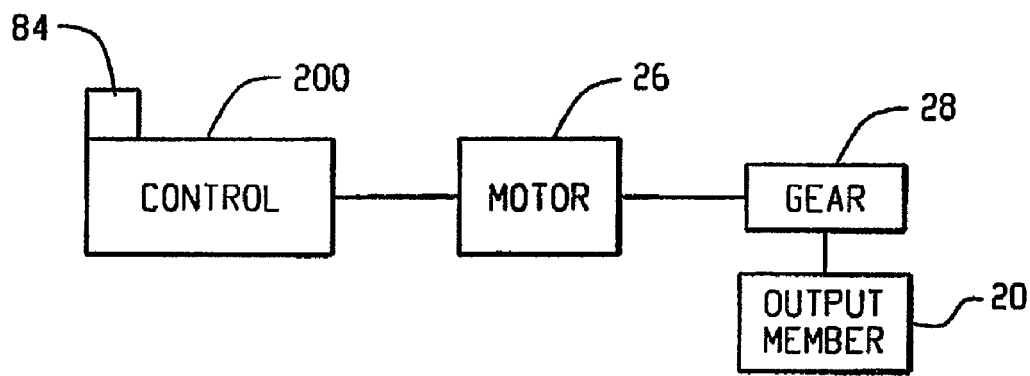
FIG. 13 is a schematic view of a mixer control system.

FIG. 13 provides a schematic of a basic drive system that includes a control unit 200 associated with motor 26 that is in turn connected to gearing system 28 to rotate the output member 20. The bowl position sensor 84 is connected to and/or may be considered part of the control unit 200 (e.g., as by providing an electronic input thereto or as by controlling the state of a relay that allows power to be delivered to the motor 26).

It is to be clearly understood that the above description is intended by way of illustration and example only, is not intended to be taken by way of limitation, and that changes and modifications are possible. For example, as an alternative to locking pin 96, a recess in left arm 24, could be provided. Further, a locking pin 96 could be retractable into the arm 24 and spring-biased into an upward position. Still further, whereas the illustrated embodiment uses a bowl with a separate stabilization member and sensor actuator, it is contemplated that the two could be combined into a single piece, as by incorporating a magnet into the stabilization member and relocating the sensor on the mixer body if necessary. Other variations are possible.

What is claimed is:

1. A mixer bowl, comprising:
    a bowl body;
    a bracket arrangement extending from the bowl body and providing a first pivot opening and second pivot opening aligned with the first pivot opening above the second pivot opening, the second pivot opening is only partially enclosed;
    a magnet located on the bowl body and spaced circumferentially from the bracket arrangement; and
    a stabilization member extending from the bowl body and substantially circumferentially aligned with the magnet, the stabilization member located below the magnet.

2. The mixer bowl of claim 1, further comprising:
    a locking bracket extending from the bowl body, the locking bracket spaced circumferentially from the bracket arrangement.

3. The mixer bowl of claim 2 wherein the bracket arrangement and locking bracket are substantially diametrically opposed to each other and the magnet and locking bracket are located about 90 degrees from each of the bracket arrangement and the locking bracket.

4. The mixer bowl of claim 3, wherein the locking bracket includes a bent ramp part extending upwardly toward a rear of the bowl.

5. The mixer bowl of claim 4, wherein the locking bracket includes a horizontal part, the bent ramp part extending upward and way from the horizontal part.

6. The mixer bowl of claim 2 wherein the locking bracket includes an opening therein, the opening is elongate in shape.

7. The mixer bowl of claim 4 wherein the opening is elongated in a direction that is generally radially outward from an upright axis of the mixer bowl.

8. The mixer bowl of claim 1 wherein the stabilization member has a curved outer surface that faces radially outward from an upright axis of the mixer bowl.

9. The mixer bowl of claim 1, wherein the bracket arrangement is formed by a first bracket spaced vertically from a second bracket, the first bracket providing the first pivot opening and the second bracket providing the second pivot opening.

10. The mixer bowl of claim 1, wherein the bracket arrangement is provided by a single bracket including a first outwardly protruding part spaced vertically from a second outwardly protruding part, the first outwardly protruding part providing the pivot first opening and the second outwardly protruding part providing the second pivot opening.

11. A method of forming a mixer bowl for placement on a mixer, the method comprising:
    mounting a bracket arrangement on a bowl body such that the bracket arrangement extends from the bowl body and provides a first pivot opening and second pivot opening aligned with the first pivot opening above the second pivot opening;
    locating a magnet on the bowl body and spaced circumferentially from the bracket arrangement; and
    mounting a stabilization member on the bowl body such that the stabilization member extends from the bowl body and substantially circumferentially aligns with the magnet, the stabilization member located below the magnet.

12. The method of claim 11 further comprising mounting a locking bracket on the bowl body such that the locking bracket extending from the bowl body and spaced circumferentially from the bracket arrangement.

13. The method of claim 12 wherein the bracket arrangement and locking bracket are substantially diametrically opposed to each other and the magnet and locking bracket are located about 90 degrees from each of the bracket arrangement and the locking bracket.

14. The method of claim 12 further comprising providing the locking bracket with an opening therein, the opening is elongate in shape.

15. The method of claim 12 further comprising providing the locking bracket with a horizontal part and a bent ramp part extending upward and away from the horizontal part toward a rear of the bowl.

16. The method of claim 11 further comprising forming the bracket arrangement by a first bracket spaced vertically from a second bracket, the first bracket providing the first pivot opening and the second bracket providing the second pivot opening.

17. The method of claim 11 further comprising forming the bracket arrangement by a single bracket including a first outwardly protruding part spaced vertically from a second outwardly protruding part, the first outwardly protruding part providing the pivot first opening and the second outwardly protruding part providing the second pivot opening.

18. A mixer bowl, comprising:
    a bowl body;
    a bracket arrangement extending from the bowl body and providing at least one pivot opening;
    a magnet mounted externally on the bowl body and spaced circumferentially from the bracket arrangement, the magnet located proximate an upper rim of the bowl body; and
    a locking bracket extending from the bowl body, the locking bracket spaced circumferentially from both the bracket arrangement and the magnet;

wherein the bracket arrangement is located lower than the magnet.

19. The mixer bowl of claim 18 wherein the bracket arrangement and locking bracket are substantially diametrically opposed to each other and the magnet is located about 90 degrees from each of the bracket arrangement and the locking bracket.

20. The mixer bowl of claim 18 further comprising:
a stabilization member extending from the bowl body and located below the magnet.

* * * * *

UNITED STATES PATENT AND TRADEMARK OFFICE
CERTIFICATE OF CORRECTION

PATENT NO. : 7,690,835 B2 Page 1 of 1
APPLICATION NO. : 12/174036
DATED : April 6, 2010
INVENTOR(S) : Schnipke et al.

It is certified that error appears in the above-identified patent and that said Letters Patent is hereby corrected as shown below:

Column 5

Line 65 Change "Claim 4" to -- Claim 6 --

Signed and Sealed this

Fifteenth Day of June, 2010

David J. Kappos
*Director of the United States Patent and Trademark Office*